United States Patent
Maeda et al.

[11] Patent Number: 6,005,834
[45] Date of Patent: Dec. 21, 1999

[54] OPTICAL RECORDING MEDIUM RECORDING AND REPRODUCING APPARATUS AND OPTICAL PICKUP DEVICE

[75] Inventors: Fumisada Maeda, Tokyo; Toshio Watanabe, Kanagawa; Isao Ichimura, Kanagawa; Atsushi Fukumoto, Kanagawa; Kenji Yamamoto, Saitama; Kiyoshi Ohsato, Chiba, all of Japan

[73] Assignee: Sony Corporation, Japan

[21] Appl. No.: 08/813,346

[22] Filed: Mar. 7, 1997

[30] Foreign Application Priority Data

Mar. 15, 1996 [JP] Japan ................................. 8-058869

[51] Int. Cl.$^6$ ................................................ G11B 7/00
[52] U.S. Cl. ........................... 369/112; 369/44.23; 369/94
[58] Field of Search ................... 369/44.14, 44.23, 369/44.24, 94, 58, 112, 110

[56] References Cited

U.S. PATENT DOCUMENTS

| | | | |
|---|---|---|---|
| 5,442,615 | 8/1995 | Ohsato et al. | 369/112 |
| 5,526,336 | 6/1996 | Park et al. | 369/112 |
| 5,684,771 | 11/1997 | Furukawa et al. | 369/58 |
| 5,689,480 | 11/1997 | Kino | 369/58 |
| 5,691,971 | 11/1997 | Kim | 369/112 |
| 5,710,749 | 1/1998 | Tsukai et al. | 369/58 |
| 5,712,842 | 1/1998 | Yamamoto et al. | 369/112 |
| 5,757,742 | 5/1998 | Akiba et al. | 369/58 |
| 5,764,613 | 6/1998 | Yamamoto et al. | 369/112 |
| 5,808,993 | 9/1998 | Lee | 369/58 |
| 5,828,635 | 10/1998 | Choi | 369/58 |
| 5,889,749 | 3/1999 | Katsuma et al. | 369/58 |

*Primary Examiner*—Nabil Hindi
*Attorney, Agent, or Firm*—Rader, Fishman & Grauer; Ronald P. Kananen

[57] ABSTRACT

An optical recording medium recording and reproducing apparatus for recording information on an optical recording medium and/or reproducing information therefrom by irradiating the optical recording medium with laser light by the use of a two-group objective lens composed of at least first and second lenses. This apparatus is provided with: a light source for emitting laser light; a first lens for converging laser light emitted from the light source; a second lens interposed between the first lens and the optical recording medium; a detecting unit for detecting a kind of the recording medium; and a movement unit for changing the distance in the direction of an optical axis between the first and second lenses by causing a relative movement between the first and second lenses. Further, the distance between the first and second lenses is changed by the movement unit, which causes the second lens to move, according to a result of a detection, which is performed by the detecting unit. Thereby, the numerical aperture NA of the objective lens is increased. Moreover, the influence of aberration is mitigated. Consequently, the high-density recording and reproducing of information signals can be achieved.

14 Claims, 6 Drawing Sheets

OPTICAL RECORDING MEDIUM RECORDING AND REPRODUCING APPARATUS AND OPTICAL PICKUP DEVICE

BACKGROUND OF THE INVENTION

1. Field of the Invention

The present invention generally relates to an apparatus and method of recording data on and reproducing data from a recording medium and, more particularly, to recording medium recording and reproducing apparatus and method, by which the distance between an objective lens and an auxiliary lens is arbitrarily changed correspondingly to the thickness of a substrate of a recording medium.

2. Description of the Related Art

In recent years, techniques of recording information or data on a recording medium and of reproducing information or data therefrom by compressing video signals and audio signals at high densities in compliance with MPEG (Moving Picture Expert Group) system or the like have been being put into practical use. In the field of AV (audio visual) techniques, DVD (namely, a digital video disk (or disc)) attracts attention as a next-generation information recording medium of an optical disk unit. Further, in the field of computer technology, an optical disk of the magneto-optical recording type and an optical disk of the phase change type receive attention as such next-generation information recording media. Moreover, it has been proposed that video signals and audio signals are recorded on DVD in compliance with MPEG system and that mass data, which is an extremely large amount of data as never recorded on a single optical disk, is recorded on a recordable optical disk.

Thus, in the case of disk-like optical recording media, such as DVD, which aim at increasing storage capacity to an extremely large capacity, it is necessary to record digital data on the disk at high density to decrease the spot size of a light beam in such a manner as to be smaller than the spot size of a light beam used to record data or information on a conventional recording medium (for instance, CD (namely, Compact Disk)).

Here, let R, θ and λ denote the radius of a spot caused by a light beam, an angle of emission of an objective lens and the wavelength of the light beam, respectively. Generally, the radius of a spot of a light beam is given by the following equation (1):

$$R = 0.32 \, \lambda / \mathrm{SIN}\theta \tag{1}$$

As is understood from the equation (1), it is sufficient for decreasing the (spot) size of the spot caused by the light beam to reduce the wavelength λ of the light beam and/or increase the numerical aperture NA (namely, $\mathrm{SIN}\theta(=n*\mathrm{SIN}\theta$ (incidentally, a refractive index n is 1 in the air)) of the objective lens.

Further, it is sufficient for increasing the numerical aperture NA of the objective lens to increase the diameter of the objective lens. However, if the diameter of the objective lens is increased, not only the size but also the mass of an optical head, which is used for recording information on a disk and for reproducing information therefrom, should be increased. Consequently, it becomes difficult to perform a focus control operation and a tracking control operation.

Thus, there has been proposed a (conventional) system adapted to irradiate a disk with optical beams, which are used for recording or reproducing information, by utilizing a solid immersion lens (namely, what is called a hemispherical lens), as disclosed in U.S. Pat. No. 5,125,750.

Figure 6:
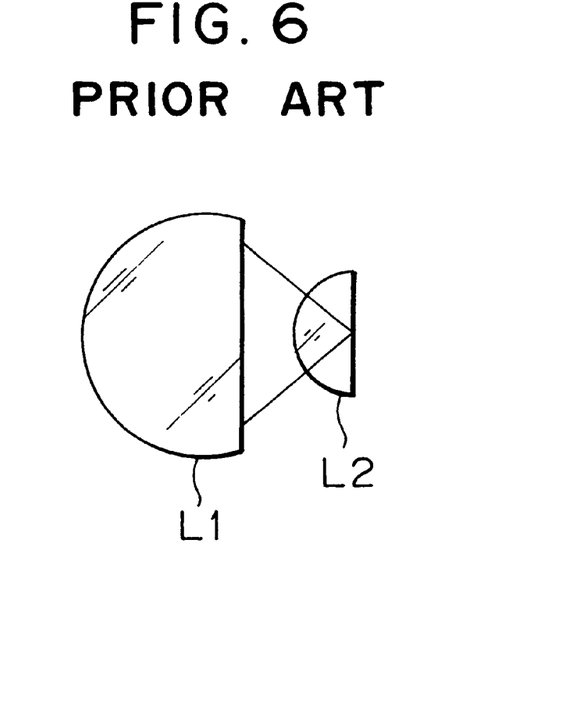
FIG. 6 is a diagram for illustrating the principle of a solid immersion lens.

In the case of the proposed system, light beams are converged by an objective lens L1 and are then incident on a solid immersion lens L2, which has an incidence surface formed as a spherical surface and further has an emission surface formed as a flat surface, as illustrated in FIG. 6. Incident light coming from the object lens L1 is incident on the solid immersion lens L2 in a direction perpendicular to the spherical surface of the solid immersion lens L2. Thus, the light beams are converged or focused on the center of the flat emission surface of the lens L2.

In the case that the refractive index of the solid immersion lens L2 is n, the numerical aperture is nSINθ. Thus, as compared with the case of a system which is not provided with the solid immersion lens L2, the numerical aperture of the objective lens of the proposed system is substantially n times that of an objective lens of the system which does not employ the solid immersion lens L2. Therefore, a high numerical aperture can be realized without increasing the diameter of an objective lens by using a two-group (namely, a doublet lens) composed of the objective lens L1 and a solid immersion lens L2. Namely, the radius of the spot obtained from the light beam is (1/n) the radius of a spot in the case of using the objective lens singly. Thus, information can be reproduced from a recording medium (namely, a disk) having recording density which is $n^2$ times the recording density in the case of using the objective lens singly.

Incidentally, actually, there is the necessity of converging light beams, which are emitted from the solid immersion lens L2, on a disk (not shown). Thus, the thickness of the solid immersion lens L2 is set at a value, which is smaller than an original value by the thickness of the disk substrate, so that an actual converging point is located on the disk.

Figure 7:
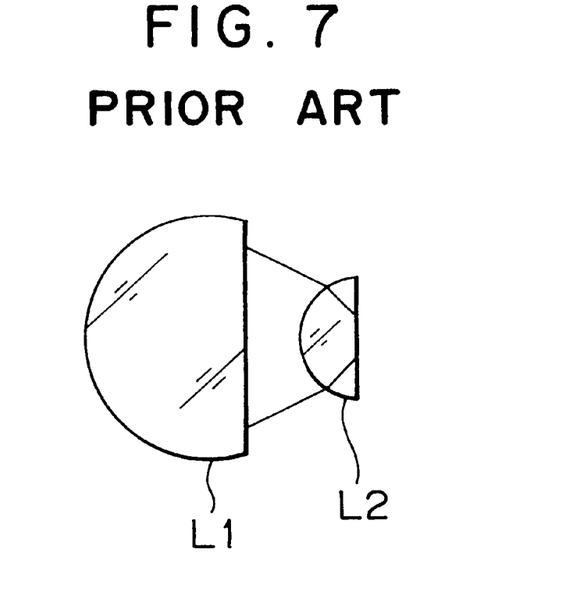
FIG. 7 is a diagram for illustrating how the solid immersion lens is actually used.

Further, to obtain a further larger numerical aperture NA, it is devised that light beams emitted from the objective lens L1 are used in such a manner as to be somewhat refracted on the spherical surface of the solid immersion lens L2 as illustrated in FIG. 7.

Meanwhile, in the case of applying such a two-group lens to an optical head, for example, it is devised that the objective lens L1 and the solid immersion lens L2 are provided in such a way as to be integral with each other and are mounted on a floating head (namely, a flying head) and that the distance between the floating head and a disk is controlled according to a floating amount (of the disk). The floating amount is, however, controlled according to the linear velocity of the disk. Thus, the floating amount changes according to the linear velocity of the disk. It is, therefore, expected that a change in the distance between the disk and the solid immersion lens L2 causes spherical aberration which acts as a disturbance to reproduction (or reproducing) signals and that thus, it is difficult to obtain favorable reproduction signals.

Moreover, there are variations in the thickness of each of a light-transmissible substrate and a solid immersion lens, which compose a disk. The variations cause the spherical aberration. In this case, the conventional system has a problem that it is difficult to record information on or reproduce information from a recording medium.

The present invention is accomplished in view of such a situation or problem of the prior art.

SUMMARY OF THE INVENTION

Accordingly, an object of the present invention is to alleviate the spherical aberration caused owing to the variations in the thickness of each of a light-transmissible substrate and a solid immersion lens, which compose a disk, thereby accurately recording information on a recording medium and reproducing information therefrom.

To achieve the foregoing object, in accordance with the present invention, there is provided an optical recording medium recording and reproducing apparatus for recording information on an optical recording medium and/or reproducing information therefrom by irradiating the optical recording medium with laser light by the use of a two-group objective lens composed of at least first and second lenses. This apparatus is provided with: a light source for emitting laser light; a first lens for converging laser light emitted from the light source; a second lens interposed between the first lens and the optical recording medium; a detecting means for detecting a kind of the recording medium; and a movement means for changing the distance in the direction of an optical axis between the first and second lenses by causing a relative movement between the first and second lenses. Further, the distance between the first and second lenses is changed by the movement means, which causes the second lens to move, according to a result of a detection, which is performed by the detecting means.

Thus, in the case of the recording medium recording and reproducing apparatus of the present invention, the kind of a recording medium is detected by the detecting means. Further, the distance in the direction of the optical axis between the first and second lenses, which compose the objective lens, is changed according to a result of the detection performed by the detecting means. Consequently, favorable recording or reproduction signals can be obtained even when information is recorded on and is reproduced from a disk having a substrate, whose thickness is not uniform.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, preferred embodiments of the present invention will be described in detail by referring to the accompanying drawings.

Figure 1:
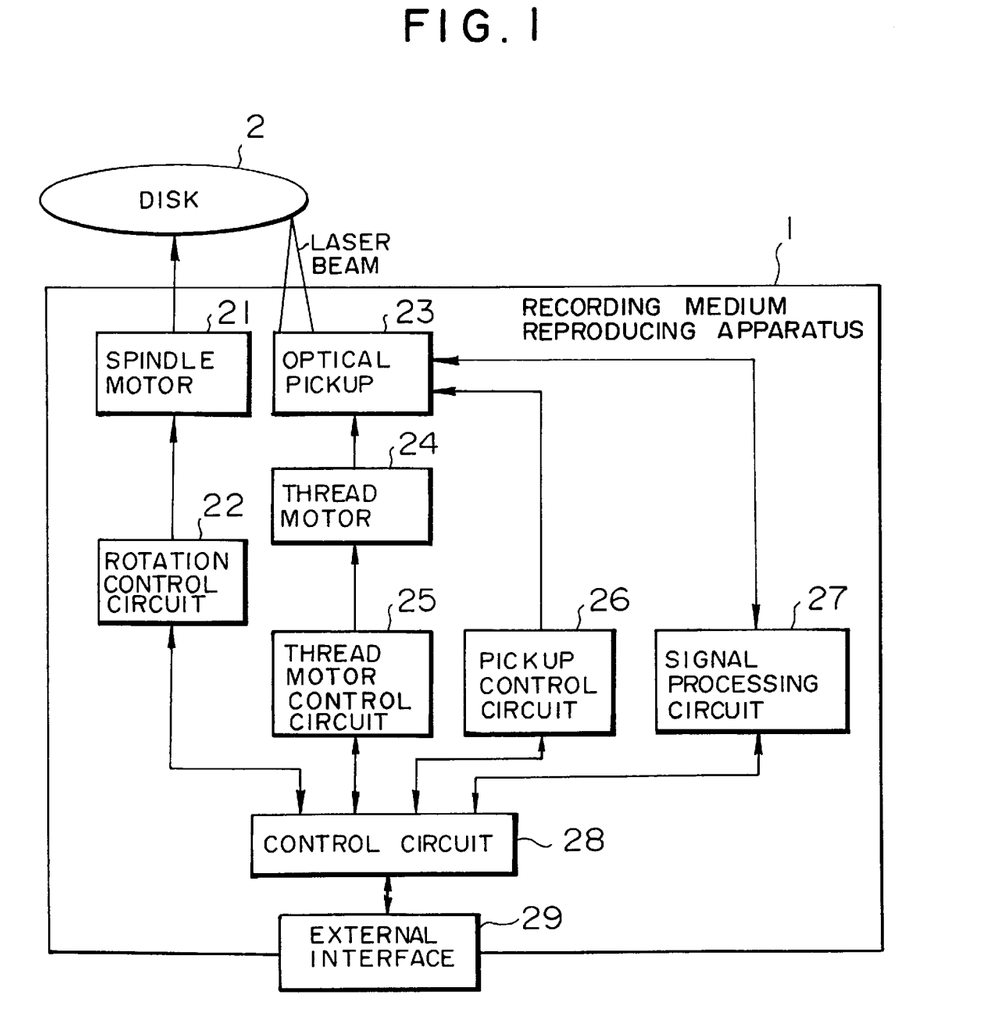
FIG. 1 is a block diagram illustrating the configuration of a recording medium reproducing apparatus 1 (to be described later) embodying the present invention, to which a recording medium recording/reproducing apparatus of the present invention is applied.

FIG. 1 is a block diagram illustrating the configuration of a recording medium reproducing apparatus 1 employing a recording medium recording/reproducing apparatus of the present invention.

The spindle motor 21 is adapted to rotate a disk 2 in response to an instruction or a command issued from a rotation control circuit 22. The rotation control circuit 22 is adapted to drive the spindle motor 21 in accordance with an instruction or a command sent from a control circuit 28.

An optical pickup 23 is adapted to converge light beams on an information recording layer and further convert light, which is reflected from the information recording layer, into a reproduction signal and furthermore output a signal processing circuit 27.

A threading motor 24 is operative to move the optical pickup 23 to a target track position on the information recording layer of the disk 2. A threading motor control circuit 25 is adapted to drive the threading motor 24 according to an instruction or a command issued from the control circuit 28.

A pickup control circuit 26 is adapted to control focusing actuator and a tracking actuator in the optical pickup 23 in response to an instruction or command signal sent from the control circuit 28.

The signal processing circuit 27 is adapted to perform modulation processing, error processing and so forth on a reproduction signal sent from the optical pickup 23, and to detect, for example, the thickness of a substrate of the disk 2 (or a kind of the disk) from the signal level of an RF signal, and further to output a detection signal, which represents the detected kind of the disk, to the control circuit 28.

The control circuit 28 is adapted to output a command or instruction to each of the aforementioned circuits in response to an instruction signal inputted through an external interface 29. Further, the control circuit 28 is adapted to outputs reproduction signals, which are inputted from the signal processing circuit 27 through an external interface 29 to external equipment.

Figure 2:
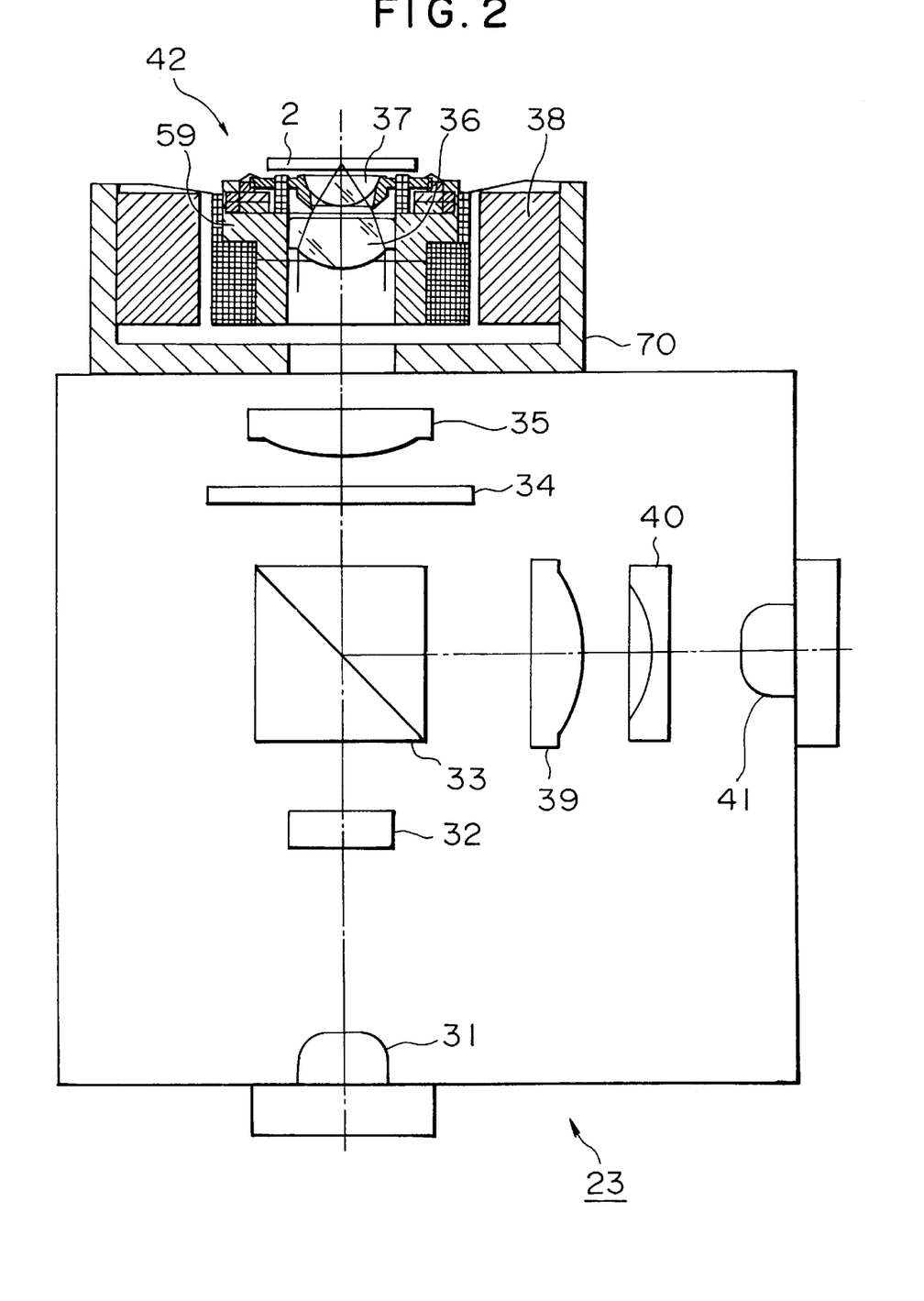
FIG. 2 is a diagram illustrating the configuration of an example of an optical pickup 23 (to be described later)

FIG. 2 is a diagram illustrating the configuration of an example of an optical pickup 23.

In the optical pickup 23, light beams emitted from a laser diode 31 are incident on a collimator (or collimating) lens 5 through a grating 32, a polarized light beam splitter 33 and a quarter wavelength plate 34. Further, the light beams, which are made by the collimator lens 35 to be parallel beams, are converged by the two-group lens, which consists of an objective lens 6 and an auxiliary lens 37, on the information recording face of the disk 2. The objective lens 36 and the auxiliary lens 37 are supported by a lens holder 59 which is held by a holding means (not shown) in such a manner as to be able to move with respect to a main base member 70.

Incidentally, a solid immersion lens, which is composed of a spherical surface and a flat surface, or an aspheric lens, which is composed of an aspheric curved surface and a flat surface, may be employed as this auxiliary lens 37.

Moreover, light reflected from the information recording face of the disk 2 is incident on the polarized light beam splitter 33 through the two-group lens (namely, the auxiliary lens 37 and the objective lens 36), the collimator lens 35 and the quarter wavelength plate 34. Furthermore, light beams reflected by the polarized light beam splitter 33 are converged on a photodetector 41, which is placed at a conjugate point, by a focusing lens 39 and a multi-lens 40. Namely, as a result of causing light beams reflected from the information recording face to impinge on the photodetector 41, digital data recorded on the information recording face of the disk 2 is converted into a reproduction signal.

When a predetermined amount of electric current is supplied, a tracking direction driving coil or a focusing direction driving coil of an actuator portion 42 is adapted to move the two-group lens in a direction corresponding to a tracking servo or to a focusing servo by utilizing a force acting between such a coil and a magnet 38.

Figure 3:
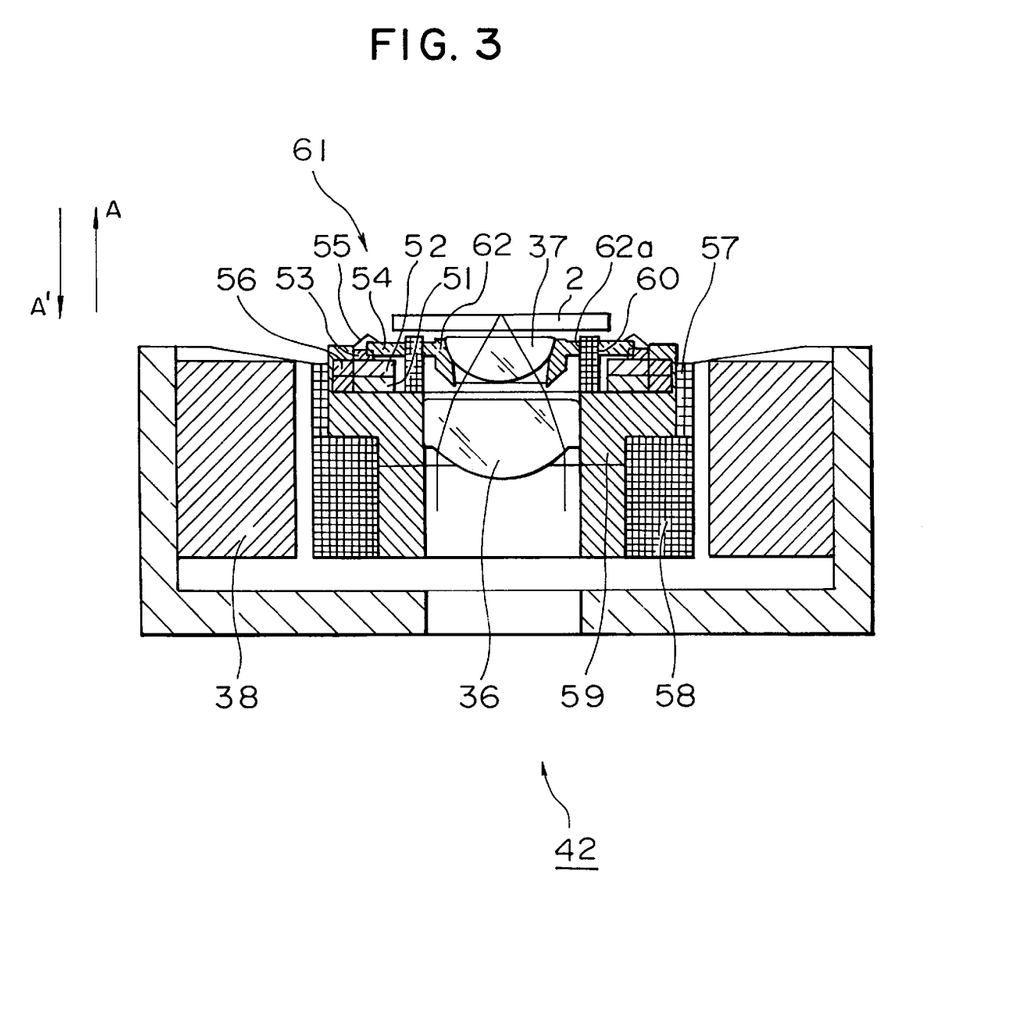
FIG. 3 is a diagram illustrating the configuration of a first example of an actuator portion 42 (to be described later)

FIG. 3 illustrates the configuration of a first example of an actuator portion 42 of the optical pickup 23 of FIG. 2. In FIG. 3, same reference characters designate corresponding parts of FIG. 2. Thus, the description of such parts is omitted herein.

When an electric current corresponding to a tracking error signal is supplied to a tracking direction driving coil 57, an electromagnetic force, which is generated between the coil 57 and the magnet 38, acts on the coil 57. This tracking direction driving coil 57 is fixed to a lens holder 59. The two-group lens (consisting of the objective lens 36 and the auxiliary lens 37) is supported on the lens holder 59, so that the movement of a base (namely, a lens holder 59) causes the two-group lens to move in a direction in which the two-group lens follows the center of a track (namely, a tracking control operation is performed).

Similarly, when an electric current corresponding to a focusing error signal is supplied to a focusing direction driving coil 58, an electromagnetic force, which is generated between the coil 58 and the magnet 38, acts on the coil 58. This focusing direction driving coil 57 is also fixed to the lens holder 59, so that the movement of the lens holder 59 causes the two-group lens to move in the direction of optical axis thereof (namely, a focusing control operation is performed).

Moreover, a stator 51 composing an ultrasonic motor 61 is attached to the lens holder 59, together with a rotator 52, feed screws 53 and 54, a pressure spring 55 and an encoder 56. This ultrasonic motor 61 is adapted to change the distance in the direction of the optical axis (namely, in the direction of arrows A and A' of FIG. 3) between the objective lens 36 and the auxiliary lens 37 in accordance with a control signal which is supplied from the pickup control circuit 26 and corresponds to the thickness of the substrate of the disk.

The stators 51 are made of PZT (lead zirconate titanate which is an electronic ceramic material) and have opposite electrode portions. Further, electrostriction (or electrostrictive) effects are produced by applying a predetermined voltage to the electrode portion. Standing waves can be generated in the stators 51 by utilizing such effects.

The rotator 52 is provided on the stators 51 and is adapted to rotate around the optical axis of the two-group lens in a horizontal plane, as viewed in this figure, by utilizing the standing waves generated in the stators 51 and a friction force that is present between the rotator 52 and each of the stators 51. Further, the rotating (or rotational) speed and the direction of rotation of the rotator 52 is changed by changing the signal level of a voltage signal supplied to the electrode portion of each of the stators 51.

The rotating speed and the position of the rotator 52 is detected by the encoder 56 attached to a peripheral portion of each of the stators 51 and the rotator 52. A result of a detection performed by the encoder 56 is outputted to the pickup control circuit 26. Thereby, an operation of the rotator 52 is monitored.

The feed screw 53 fixed to the rotator 52 has screw threads of predetermined pitch and diameter. Further, the feed screw 54 formed on the periphery of the holder 62, to the central portion of which the auxiliary lens 37 is fixed, has screw threads of predetermined pitch and diameter that correspond to the pitch and the diameter of the threads of the screw 54. The screw threads of the feed screw 54 are engaged with those of the feed screw 53. Namely, when the rotator 52 rotates in a predetermined manner, the feed screw 53 also rotates in conjunction with the rotator 52. As a result, the feed screw 54 engaged with the feed screw 53 is driven.

Incidentally, a detent 60 fixed to the lens holder 59 pierces through a hole 62a of the holder 62, so that the holder 62 is inhibited from rotating. As a result, when the rotator 52 rotates, the holder 62 does not rotate but moves upwardly or downwardly (namely, in the direction of the arrows A and A') as shown in FIG. 3.

The pressure spring 55 has an end portion fixed to the lens holder 59 and further has the other end portion which pushes down the holder 62 (namely, in the direction of the arrow A' in this figure). Thereby, the intimate contact between the stator 51 and the rotator 52 is enhanced. Moreover, the distance between the objective lens 36 and the auxiliary lens 37 is prevented from varying owing due to vibrations in the direction of the optical axis, which occur when the two-group lens follows the axial deflection of the disk 2. Therefore, even when the two-group lens is accelerated as a result of the movement of the base (namely, the lens holder) 59, the distance between the objective lens 36 and the auxiliary lens 37 is maintained at a constant value.

In this way, the distance between the objective lens 36 and the auxiliary lens 37 can be changed according to the distance between the disk 2 and the auxiliary lens 37 and the thickness of the substrate of the disk 2.

Next, the spherical aberration caused by the error of the thickness of the substrate of the disk 2 will be described hereinbelow by referring to FIG. 4.

Here, consider the case where information is reproduced from the disk 2, whose substrate thickness error (namely, the error of the thickness of the substrate) is Δd, by using the two-group lens consisting of the objective lens 36 and the auxiliary lens 37. Spherical aberration W40 occurring in this case is given by the following equation (2):

$$W40=(n^2-1)(NA^4)\Delta d/(8n^3) \qquad (2)$$

where n designates the refractive index of the disk 2; and NA the numerical aperture.

Meanwhile, as shown in FIG. 3, the spherical aberration W40 occurring in the case, in which the distance between the objective lens 36 and the auxiliary lens 37 is changed according to the error of the thickness of the substrate so as to reduce the spherical aberration, is obtained by the following equation (3):

$$W40=(n-1)(\Delta d)^2((SIN\theta)^4)/(8a) \qquad (3)$$

where a designates the radius of curvature of the auxiliary lens 37.

Figure 4:
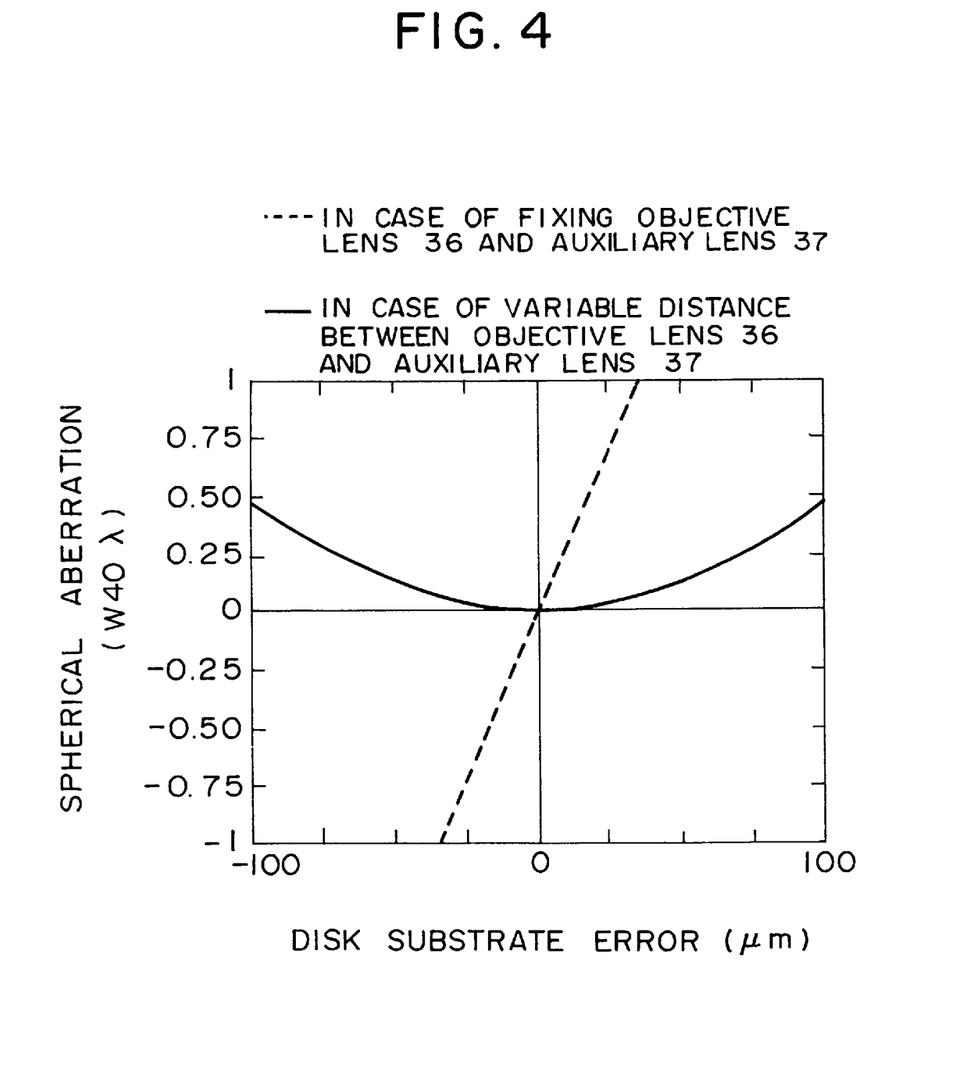
FIG. 4 is a graph illustrating a spherical aberration due to an error of thickness of a disk substrate.

FIG. 4 illustrates a graph of the spherical aberration caused in these cases, which is plotted by using the equations (2) and (3), on condition that the numerical aperture NA, the refractive index n of the substrate and the radius of curvature of the auxiliary lens are 0.8, 1.5 and 1.25 mm, respectively.

In the graph of FIG. 4, the axis of abscissa represents the error of the thickness of the substrate; the axis of ordinates the caused spherical aberration. Further, in this figure, a dashed (or dotted) line indicates the spherical aberration caused in the case that the distance between the objective lens 36 and the auxiliary lens 37 is fixed; and a solid curve the spherical aberration caused in the case that the distance therebetween is variable. Furthermore, a unit of measure used to describe the abscissa values is $\mu$m, while a unit of measure to describe the ordinates is $\lambda$rms (incidentally, "rms" is an abbreviation of "root-mean-square").

As is obvious from the equation (2), the spherical aberration in the case of fixing the distance between the objective lens 36 and the auxiliary lens 37 is proportional to the error $\Delta d$. The constant of proportion in this case is proportional to $NA^4$. Thus, the graph shown by the dashed line in FIG. 4 is steep.

In contrast, the spherical aberration in the case, in which the distance between the objective lens 36 and the auxiliary lens 37 is variable, is proportional to $(\Delta d)^2$, as is obvious from the equation (2). Further, in this case, the error $\Delta d$ is a small quantity expressed in $\mu$m. Thus, the square of the error $\Delta d$ has a further smaller value. Consequently, the graph shown by the solid curve in FIG. 4 is drawn like a gentle parabola.

As is understood from FIG. 4, in the case of suitably changing the distance between the objective lens 36 and the auxiliary lens 37, the spherical aberration caused due to the error of the thickness of the substrate can be suppressed, in comparison with the case that the distance therebetween is fixed.

Namely, in the case that the distance between the objective lens 36 and the auxiliary lens 37 is changed according to the error of the thickness of the substrate of the disk 2 as illustrated in FIG. 3, the spherical aberration occurring at that time can be suppressed, so that favorable reproduction signals can be obtained.

Figure 5:
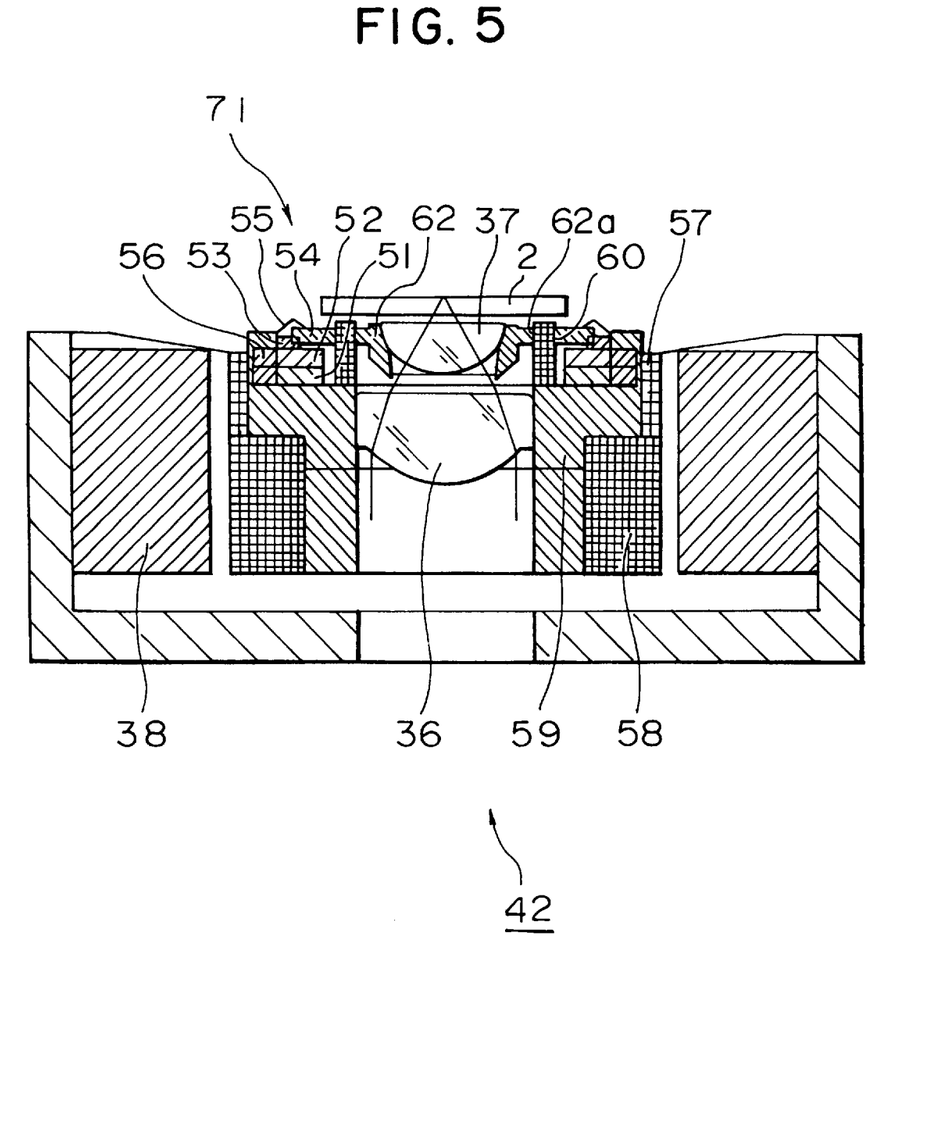
FIG. 5 is a diagram illustrating the configuration of a second example of the actuator portion 42.

FIG. 5 is a diagram illustrating the configuration of a second example of the actuator portion 42. In FIG. 5, same reference characters designate corresponding parts of FIG. 3. Thus, the description of such parts is omitted herein.

In the case of this example, a stepping motor 71, which has stators 72 and a rotator 73, is used, instead of the ultrasonic motor 61. Moreover, the rotator 73 is driven by a predetermined amount in this example in accordance with a pulse signal corresponding to the thickness of the substrate of the disk 2, which is supplied from the pickup control circuit 26. An operation in this case is similar to that in the case of using the ultrasonic motor 61 and therefore, the description thereof is omitted herein.

Thus, the spherical aberration caused at the time of reproducing information can be reduced by changing the distance between the objective lens 36 and the auxiliary lens 37 according to the thickness of the substrate of the disk 2 as above described. Consequently, favorable reproduction signals can be obtained.

In the foregoing apparatuses of the present invention, the ultrasonic motor 61 or the stepping motor 71 is used. However, other motors, which have what is called holding (or retention) ability, may be employed. Namely, a motor may be employed as long as the rotational position thereof is not changed even when the supply of power is stopped and an external force having some strength is exerted thereon. Needless to say, theoretically, a motor having such holding ability may be employed. However, in such a case, it is inconvenient that the power should be supplied at all times. Additionally, the apparatus of the present invention may be adapted so that the kind of a disk is detected the control circuit 38 from a signal designated or inputted by a user.

Incidentally, the present invention can be applied not only to the case of recording information but also the case of recording information on or reproducing information from a recording medium other than a disk.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. An optical recording medium recording and reproducing apparatus for recording information on an optical recording medium and/or reproducing information therefrom by irradiating said optical recording medium with laser light, comprising:

a light source for emitting laser light;

a first lens for converging laser light emitted from said light source;

a second lens interposed between said first lens and said optical recording medium;

detecting means for detecting a kind of said recording medium;

an ultrasonic motor for changing a distance in a direction of an optical axis between said first and second lenses by moving at least one of said first and second lenses relative to the other of said first and second lenses in the direction of the optical axis; and a lens holder that supports said first and second lenses and is movable in a direction of an optical axis along a light beam emitted from said light source and in a direction perpendicular to the direction of the optical axis, wherein said ultrasonic motor is driven according to a result of a detection performed by said detecting means and maintains a selected distance between said first and second lenses after being driven.

2. The optical recording medium recording and reproducing apparatus according to claim 1, further comprising an actuator for driving said lens holder in a direction of the optical axis along a light beam emitted from said light source and in a direction perpendicular to the direction of the optical axis.

3. The optical recording medium recording and reproducing apparatus according to claim 1, wherein said second lens is supported by said holder to be movable in the direction of the optical axis.

4. The optical recording medium recording and reproducing apparatus according to claim 1, wherein a surface of said second lens facing a recording medium is a nearly flat face, and wherein a surface of said second lens facing said first lens is a curved face.

5. An optical recording medium recording and reproducing apparatus for recording information on an optical recording medium and/or reproducing information therefrom by irradiating said optical recording medium with laser light, comprising:

a light source for emitting laser light;

a first lens for converging laser light emitted from said light source;

a second lens interposed between said first lens and said optical recording medium;

detecting means for detecting a kind of said recording medium;

a stepping motor for changing a distance in a direction of an optical axis between said first and second lenses by moving at least one of said first and second lenses relative to the other of said first and second lenses in the direction of the optical axis; and a lens holder that supports said first and second lenses and is movable in a direction of an optical axis along a light beam emitted from said light source and in a direction perpendicular to the direction of the optical axis, wherein said stepping motor is driven according to a result of a detection performed by said detecting means and maintains a selected distance between said first and second lenses after being driven.

6. The optical recording medium recording and reproducing apparatus according to claim 5, further comprising an actuator for driving said lens holder in a direction of the optical axis along a light beam emitted from said light source and in a direction perpendicular to the direction of the optical axis.

7. The optical recording medium recording and reproducing apparatus according to claim 5, wherein said second lens is supported by said holder to be movable in the direction of the optical axis.

8. The optical recording medium recording and reproducing apparatus according to claim 5, wherein a surface of said second lens facing a recording medium is a nearly flat face, and wherein a surface of said second lens facing said first lens is a curved face.

9. The optical recording medium recording and reproducing apparatus according to claim 1, wherein said ultrasonic motor moves said second lens toward said first lens in the direction of the optical axis, and further comprising:

a coil attached to said lens holder;

a magnetic circuit for moving said lens holder in a direction of an optical axis along a light beam emitted from said light source and in a direction perpendicular to the direction of the optical axis.

10. The optical recording medium recording and reproducing apparatus according to claim 5, wherein said stepping motor moves said second lens toward said first lens in the direction of the optical axis, and further comprising:

a coil attached to said lens holder;

a magnetic circuit for moving said lens holder in a direction of an optical axis along a light beam emitted from said light source and in a direction perpendicular to the direction of the optical axis.

11. The optical pickup device according to claim 9, wherein a surface of said second lens facing a recording medium is a nearly flat face, and wherein a surface of said second lens facing said first lens is a curved face.

12. The optical pickup device according to claim 10, wherein a surface of said second lens facing a recording medium is a nearly flat face, and wherein a surface of said second lens facing said first lens is a curved face.

13. The optical pickup device according to claim 9, wherein said movement means has a screw feeding portion interposed between said lens holder and said second lens.

14. The optical pickup device according to claim 10, wherein said movement means has a screw feeding portion interposed between said lens holder and said second lens.

* * * * *